(12) United States Patent
Cheng et al.

(10) Patent No.: US 8,792,782 B1
(45) Date of Patent: Jul. 29, 2014

(54) INTERCHANGEABLE ZOOM LENS ACTUATOR WITH AUTO-FOCUS ADJUSTMENT

(71) Applicant: Hong Kong Applied Science and Technology Research Institute Co. Ltd., New Territories (HK)

(72) Inventors: Kwok Sing Cheng, New Territories (HK); Kin Ming Fan, Ngau Tau Kwok (HK); Chuen Kuen Yeung, New Territories (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 0 days.

(21) Appl. No.: 14/020,551

(22) Filed: Sep. 6, 2013

Related U.S. Application Data

(63) Continuation-in-part of application No. 13/802,472, filed on Mar. 13, 2013.

(60) Provisional application No. 61/831,102, filed on Jun. 4, 2013.

(51) Int. Cl.
 *G03B 17/00* (2006.01)

(52) U.S. Cl.
 USPC .......................................................... 396/75

(58) Field of Classification Search
 CPC .................... H04N 5/2328; H04N 5/23287
 USPC .......... 396/73, 75; 348/208.7, 208.11, 208.12
 See application file for complete search history.

(56) References Cited

U.S. PATENT DOCUMENTS

| | | | | |
|---|---|---|---|---|
| 6,567,352 | B1 * | 5/2003 | Inui et al. | 369/44.21 |
| 7,747,155 | B1 * | 6/2010 | Gutierrez | 396/73 |
| 2006/0285838 | A1 * | 12/2006 | Mashima et al. | 396/55 |
| 2009/0195087 | A1 | 8/2009 | Kurosawa | |
| 2010/0237718 | A1 | 9/2010 | Tsai et al. | |

FOREIGN PATENT DOCUMENTS

CN 200920050021.3 2/2010

\* cited by examiner

*Primary Examiner* — Clayton E Laballe
*Assistant Examiner* — Noam Reisner
(74) *Attorney, Agent, or Firm* — Berkeley Law & Technology Group, LLP

(57) ABSTRACT

The subject matter disclosed herein relates to an optical module that includes interchangeable lenses to adjust a zoom level or focus of the optical module.

21 Claims, 11 Drawing Sheets

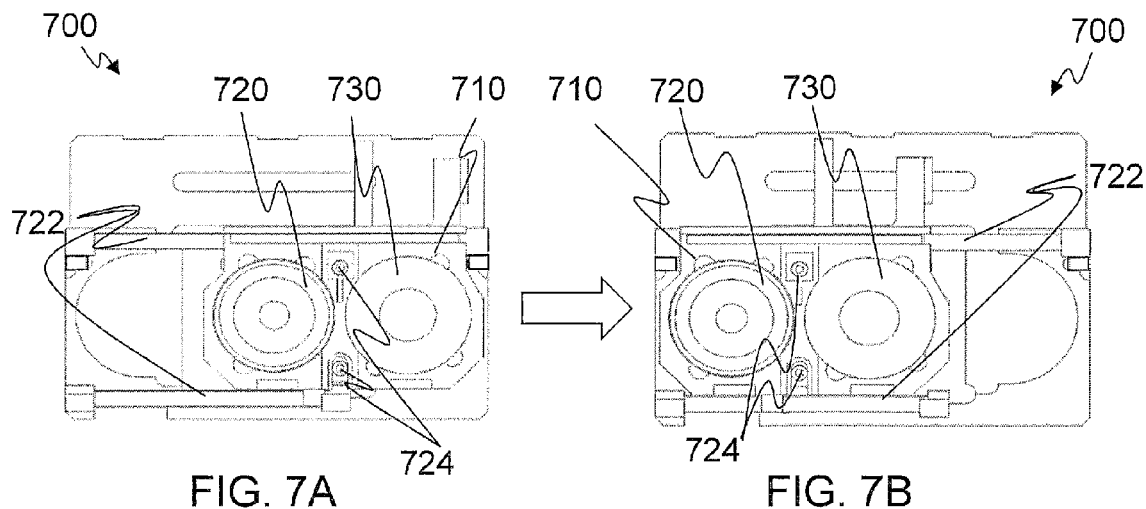
FIG. 7A    FIG. 7B
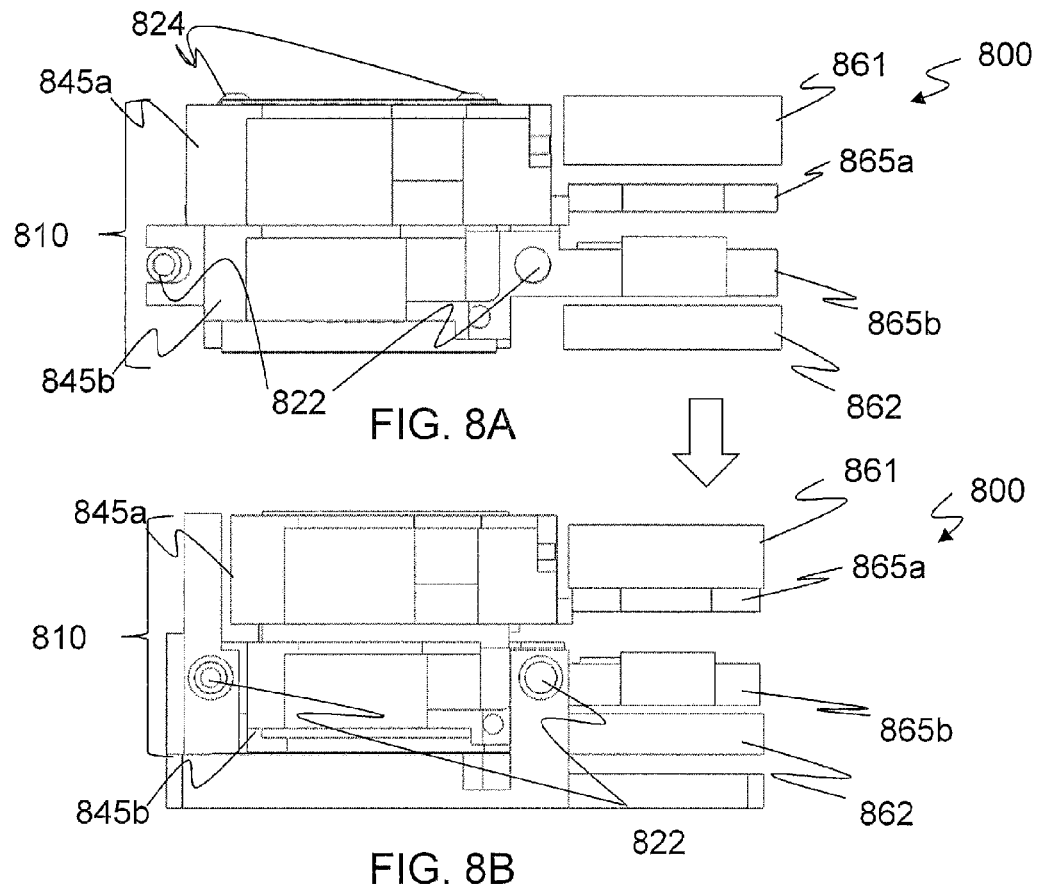
FIG. 8A
FIG. 8B

INTERCHANGEABLE ZOOM LENS ACTUATOR WITH AUTO-FOCUS ADJUSTMENT

CROSS REFERENCE TO RELATED APPLICATIONS

The present application is related to, and claims priority from, U.S. Provisional Pat. Appl. No. 61/831,102, filed on Jun. 4, 2013, and titled INTERCHANGEABLE ZOOM LENS ACTUATOR WITH AUTO-FOCUS ADJUSTMENT, and is a continuation-in-part application of U.S. Non Provisional patent application Ser. No. 13/802,472, filed on Mar. 13, 2013, and titled INTERCHANGEABLE ZOOM LENS ACTUATOR WITH AUTO-FOCUS ADJUSTMENT, which are hereby incorporated by reference.

FIELD

The subject matter disclosed herein relates to an optical module that includes interchangeable lenses to adjust a zoom level or focus of the optical module.

BACKGROUND

Many portable electronic apparatuses, such as a cellular phone and/or a personal digital assistant (PDA) for example, may comprise a compact camera module. Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can be manufactured with reduced cost by reducing manufacturing tolerances of an optical system of the camera modules.

BRIEF DESCRIPTION OF THE DRAWINGS

Non-limiting and non-exhaustive embodiments will be described with reference to the following objects, wherein like reference numerals refer to like parts throughout the various objects unless otherwise specified.

FIG. 3A is a perspective view of a compact imaging module, and FIGS. 3B and 3C illustrate a cross section of a magnet/coil arrangement according to two different embodiments.

FIGS. 7A and 7B illustrate a top-down view of a compact imaging module, according to an embodiment.

FIGS. 8A and 8B illustrate a side view of a compact imaging module, according to an embodiment.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

As used to describe such embodiments, terms "above", "below", "upper", "lower", "horizontal", "vertical", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to an optical axis while "vertical" may refer to an orientation parallel to the optical axis.

Figure 1A:
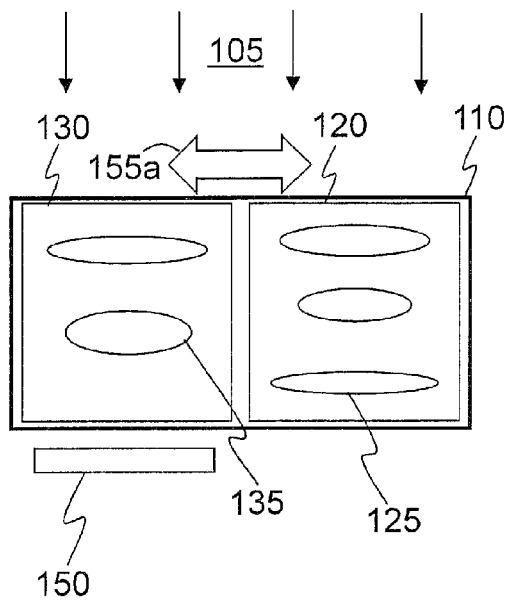
FIGS. 1A-1C include schematic cross-section views of lens assemblies and an image sensor, according to an embodiment.
Figure 1B:
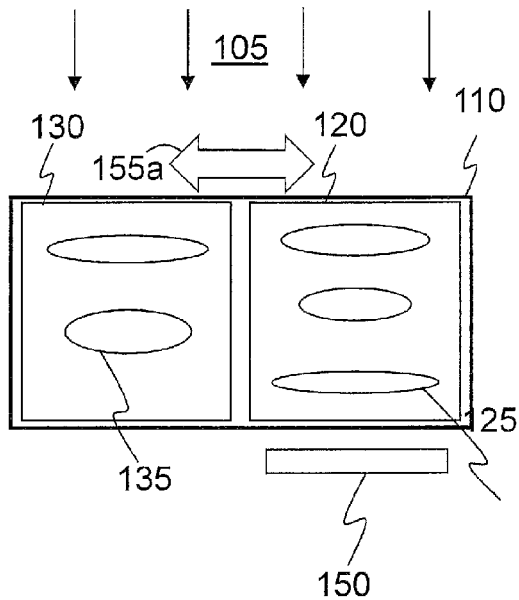
Figure 1C:
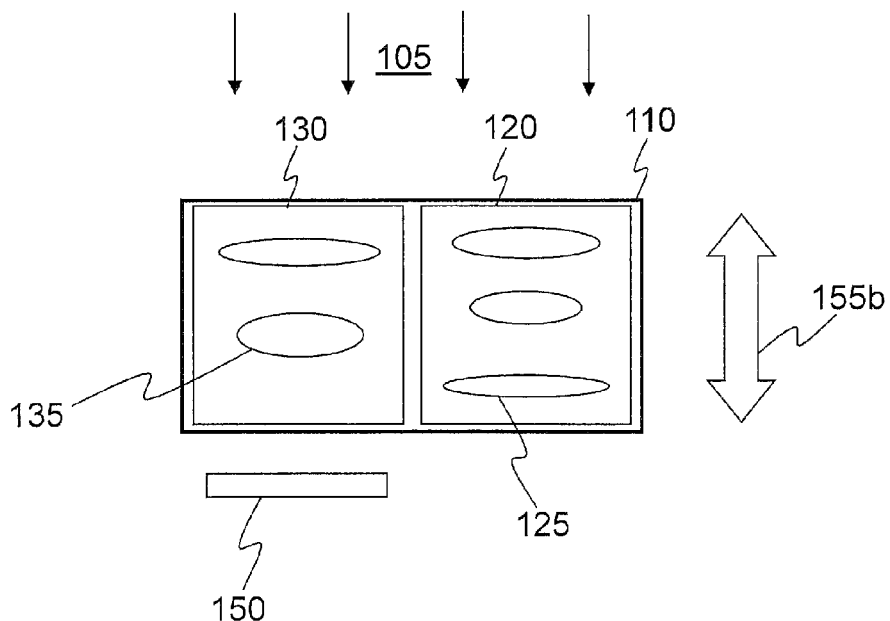

Embodiments described herein include a compact imaging module that provides a mechanism and/or allows a process to select one of two or more individual lens assemblies, and adjusting a focal ratio between the two or more individual lens assemblies and an image sensor. FIGS. 1A, 1B, and 1C include schematic cross-section views of lens assemblies and an image sensor, according to a particular embodiment. A first lens assembly 130 may comprise two or more optical elements 135, which may comprise a plurality of lenses, for example. A second lens assembly 120 may comprise two or more optical elements 125, which may comprise a plurality of lenses, for example. First lens assembly 130 may provide a different zoom level to the compact imaging device than that of second lens assembly 120. A selected lens assembly (e.g., lens assembly 120 or 130) may receive light 105 and provide an image to image sensor 150.

In FIG. 1A, a selected lens assembly may comprise first lens assembly 130 placed near an image sensor 150 to provide an image onto an active region (not shown) of the image sensor while unselected second lens assembly 120 may be set aside and placed away from the image sensor. In FIG. 1B, a selected lens assembly may comprise second lens assembly 120 placed near image sensor 150 to provide an image onto the image sensor while unselected first lens assembly 130 may be set aside and placed away from the image sensor. Selection of a particular lens assembly may be made by moving a platform or frame 110 in a direction indicated by arrow 155a, for example. However, other embodiments are contemplated by the present disclosure, including, but not limited to, moving an image sensor 150 relative to a moving platform 110, among other things.

A compact imaging module may also allow focus adjustments by selectively changing a distance between individual lens assemblies and an image sensor. For example, in FIG. 1C, selected first lens assembly 130 and unselected second lens assembly 120 may be moved in a direction indicated by arrow 155b. A distance between a lens assembly and an image sensor, for example, may be adjustable, at least in part, in response to a mechanical force or an electromagnetic force, for example. A distance may be measured along an optical axis of the lens assembly. In an implementation, a mechanical force to select among two or more lens assemblies and to adjust focus of the selected lens assembly. In another implementation, an electromagnetic force may be used to select among two or more lens assemblies and to adjust focus of the selected lens assembly, and the electromagnetic force may be generated by two or more coils and two or more arrays of magnets, as described below. In a particular embodiment, for example, a structure comprising a compact imaging module, such as a compact camera module, may provide zoom capability, auto-focus, and/or other imaging functions by adjusting a distance between individual lens assemblies and an image sensor. A compact imaging module may provide an advantage to designers incorporating such a module into increasingly slimmer, smaller, and/or lighter portable electronic apparatuses, such as a compact camera or cell phone, for example. Of course, such details of a compact imaging module are merely examples, and claimed subject matter is not so limited.

In one embodiment, a compact imaging module may comprise a first lens assembly having a first effective focal length and a second lens assembly having a second effective focal length. The term "effective focal length" refers to a focal length of an assembly of individual lenses, as opposed to a focal length of an individual lens. A magnification or zoom level of a lens assembly may be based, at least in part, on the effective focal length of the lens assembly. Accordingly, a first lens assembly having a first effective focal length may produce an image having one zoom level and a second lens assembly having a second effective focal length may produce an image having another zoom level. A compact imaging module may comprise a movable platform 110 on which first and second lens assemblies, 120 and 130, may be mounted. An image sensor 150 may receive light 105 from the first lens assembly 130 if the movable platform 110 is in a first position (see FIG. 1A) or the image sensor 150 may receive light 105 from the second lens assembly 120 if the movable platform 110 is in a second position (see FIG. 2A). In particular, a movable platform 110 may selectively place a first lens assembly 130 or a second lens assembly 120 in a position so that light 105 transmitting through the selected lens assembly may be received by an image sensor 150. Meanwhile, an unselected lens assembly may be placed in a position so that any light transmitted through the unselected lens assembly may not be received by the image sensor 150. In one implementation, a compact imaging module may comprise one or more sensors to detect a position of the movable platform. For example, position sensors, may detect a horizontal and/or vertical position of the movable platform 110 with respect to a reference position. In one implementation, the position sensor may comprise a Hall sensor, among other things.

A compact imaging module may comprise a combination of magnets and coils to move a movable platform 110 in a first direction and a second direction, 155a and 155b, to move the movable platform 110 to a first position or a second position (see FIGS. 1A and 1B), and to change a distance between an image sensor and the movable platform. The combination of magnets and coils may generate attractive, repulsive or other forces in response to receiving electrical current. In one example, a source of electromagnetic power may comprise a first and a second array of magnets and a first and second coil, for example. In a further example, a first coil may comprise one or more coils arranged in proximity to a first array of magnets, and a second coil may comprise one or more coils arranged in proximity to a second array of magnets. In this example, the polarity of adjacent magnets within the first and second arrays of magnets may be complementary, meaning that the polarity of any given magnet will be different from the polarity of its immediately adjacent magnets.

Motion of the movable platform 110 and/or first and second lens assemblies 120 and 130 may occur in at least a first and a second direction, 155a and 155b. For instance, motion in the second direction 155b may comprise a linear vertical motion. Movement in the second direction 155b may change a distance between a movable platform 110 and/or a lens assembly (e.g., 120 or 130) and an image sensor 150, and/or may adjust a focus of the lens assemblies (e.g., 120 or 130) with respect to the image sensor 150. In other words, a distance between a lens assembly (e.g., 120 or 130) and an image sensor 150 may be adjusted so that a focused image produced by the lens assembly is received by the image sensor 150.

In one implementation, a combination of magnets and coils may move a movable platform 110 along a range of positions in a first direction 155a. Moving a movable platform 110 to a first position or a second position may provide a technique for selecting a first lens assembly 130 having a first effective focal length or a second lens assembly 120 having a second effective focal length to be placed in front of an image sensor 150. Accordingly, by changing a position of a movable platform 110 in a first direction 155a, a zoom level of a compact imaging module may be selected among two values (or three or more values in a case where a compact imaging module comprises three or more individual lens assemblies). For example, a movable platform 110 in a first position placing a first lens assembly 130 in front of an image sensor 150 may enable a compact imaging module to have a first zoom level. The movable platform 110 in a second position to place a second lens assembly 120 in front of the image sensor 150 may enable a compact imaging module to have a second zoom level.

At particular portions of the range of positions in the first direction 155a, the combination of magnets and coils may apply a force to the movable platform 110 in a second direction 155b (e.g., perpendicular to the horizontal direction), substantially parallel to an optical axis of the lens assemblies. The combination of magnets and coils, which may be referred to more generally as an electromagnetic actuator or actuator, that induce motion of a movable platform 110 in a direction along an optical axis may provide a relatively precise control of motion of one or more lens assemblies (e.g., 120 and 130)

located on the movable platform 110. For example, such an electromagnetic actuator may provide a continuous, linear motion so that distance between a selected lens assembly (e.g., 120 or 130) and an image sensor 150 may be adjusted by any amount. Such adjustments may be made, for example, to focus an image of a lens assembly onto an image sensor 150. For example, the actuator may produce varying magnitudes of vertical displacement of an upper portion of a movable platform based, at least in part, on a varying magnitude of horizontal displacement of a portion of the actuator, as described below. Such varying magnitudes may provide varying distances between a lens assembly and an image sensor to precisely control a focus of light onto the image sensor.

In one embodiment, a compact imaging module may comprise a movable lens platform comprising an upper portion and a lower portion. The upper portion may support a first lens assembly having a first effective focal length and a second lens assembly having a second effective focal length. For example, the first and second lens assemblies may be mounted to and physically supported by the upper portion of the lens platform. An image sensor may receive light from a first lens assembly if the lens platform is in a first position or the image sensor may receive light from a second lens assembly if the lens platform is in a second position. An actuator may move the lens platform in a horizontal direction to select the first or second lens assembly to be optically aligned with the image sensor, for example.

The upper portion of the lens platform may be configured to move in a vertical direction to change a distance between the image sensor and the upper portion. Focus of either of the lens assemblies may be adjusted by such changing of the distance. Of course, such details of a compact imaging module are merely examples, and claimed subject matter is not so limited.

Figure 2:
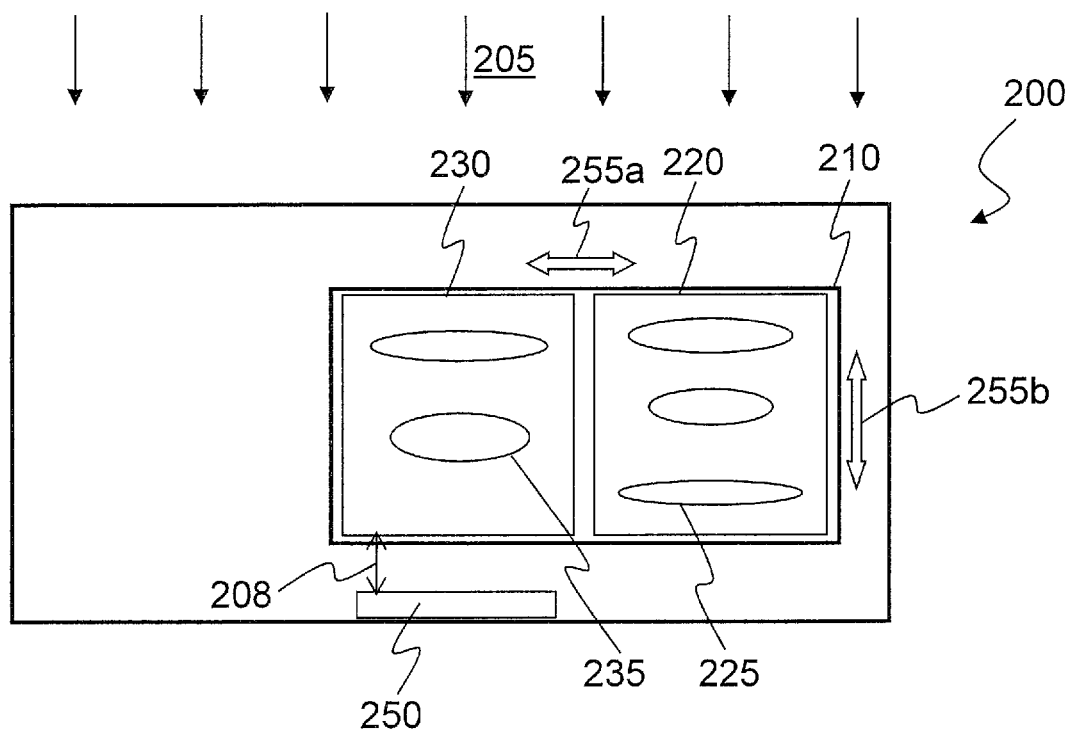
FIG. 2 includes a schematic cross-section view of lens assemblies and an image sensor, according to another embodiment.

FIG. 2 includes a schematic cross-section view of lens assemblies 220 and 230 and an image sensor 250 of a compact imaging module 200, according to another embodiment. A first lens assembly 230 may comprise two or more optical elements 235, which may comprise a plurality of lenses, for example. A second lens assembly 220 may comprise two or more optical elements 225, which may comprise a plurality of lenses, for example. First lens assembly 230 may provide a different zoom level to the compact imaging device than that of second lens assembly 220. A selected lens assembly (e.g., lens assembly 220 or 230) may receive light 205 and provide an image to image sensor 250. The image sensor may include an active region (not shown) comprising an array of pixilated charge-coupled devices (CCD) and/or one or more complementary metal-oxide-semiconductor (CMOS) devices, just to name a few examples. Image sensor 250 may also comprise an inactive region (not shown) at least partially surrounding an active region. Such an inactive region may comprise a border or frame for an active region that may be used to physically support other portions of a compact imaging module without interfering with light impinging on the active region.

In the case shown in FIG. 2, a selected lens assembly may comprise first lens assembly 230 placed near an image sensor 250 to project an image onto an active region (not shown) of the image sensor 250 while unselected second lens assembly 220 may be positioned such that any light 205 refracted through optical elements 225 is directed away from the image sensor 250. Selection of first lens assembly 230 or second lens assembly 220 may be made by moving a platform or frame 210 in a direction indicated by arrow 255a, for example. A compact imaging module 200 may also allow focus adjustments by selectively changing a distance 208 between individual lens assemblies (e.g., 220 or 230) and an image sensor, such as image sensor 250. For example, selected first lens assembly 230 and unselected second lens assembly 220 may be moved in a direction indicated by arrow 255b. A distance 208 between lens assembly 230 and image sensor 250, for example, may be adjustable, at least in part, in response to an electromagnetic force generated by one or more magnets and a coil, as described below.

Figure 3A:
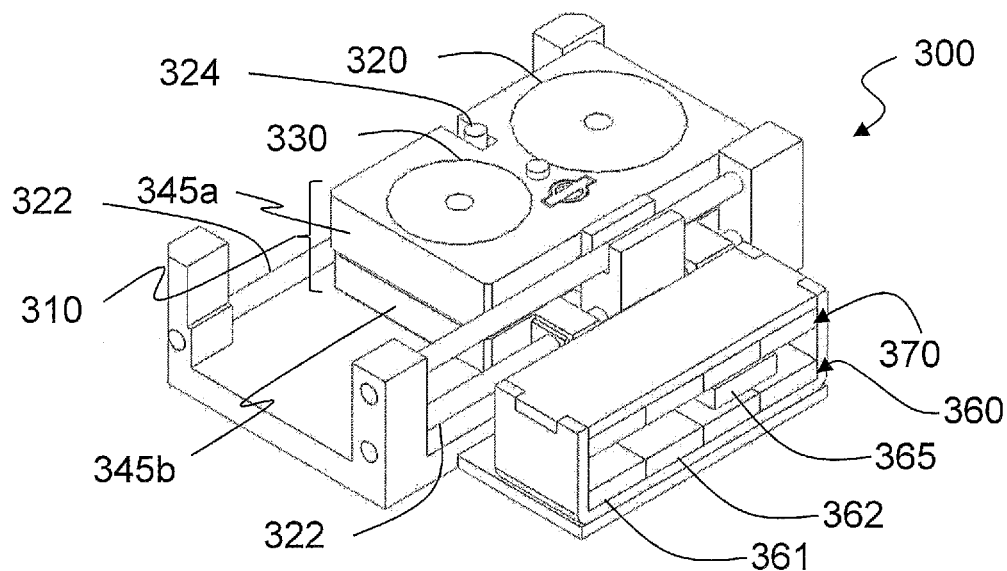
FIGS. 3A-3C illustrate an embodiment of a compact imaging module according to several different embodiments.

FIG. 3A is a perspective view of a compact imaging module 300, according to one embodiment. Compact imaging module 300 may comprise a first lens assembly 330 having a first effective focal length and a second lens assembly 320 having a second effective focal length. A compact imaging module 300 may comprise a movable platform 310 on which first and second lens assemblies 330 and 320 may be mounted. Movable platform 310 may comprise an upper portion 345a and a lower portion 345b. In one embodiment, first and second lens assemblies 330 and 320 may mounted in movable platform 310 such that the upper portion 345a is fixably connected to first and second lens assemblies 330 and 320, while the lower portion 345b may slidably connected to first and second lens assemblies 330 and 320. In this arrangement, the first and second lens assemblies 330 and 320 may be configured to move horizontally with both the upper and lower portions 345a and 345b of the movable platform 310, while first and second lens assemblies 330 and 320 may move vertically with only the upper portion 345a of the movable platform. Of course, the particular arrangements and connections may vary in different embodiments, and the foregoing is offered as an illustrative example of merely one of many possible embodiments.

Compact imaging module 300 may comprise an actuator including a number of portions. For example, an actuator may include a coil 365, a first magnet array 360, and a second magnet array 370, though claimed subject matter is not limited in this respect. In one embodiment, the first and second magnet arrays 360 and 370 may comprise a plurality of individual magnets, such as first magnet 361 and second magnet 362. First and second magnet arrays 360 and 370 may be configured such that each individual magnet making up the array, such as first and second magnets 361 and 362 may have a polarity opposite of that of the magnets immediately adjacent. Thus, for example, first magnet 361 may have a first polarity, and second magnet 362 may have a second polarity opposite to the first polarity, and so on. The combination of coil 365 and first and second magnet arrays 360 and 370 may be referred to generally as an actuator, an electromagnetic actuator, or an electro-mechanical actuator. Such an actuator may be connected to movable platform 310 and may be configured to move movable platform 310 along a first guide 322 in a first or horizontal direction, for example. However, the same actuator may also be configured to move movable platform 310 along a second guide 324 in a second or vertical direction, for example. Of course, such details of compact imaging module 300 are merely examples, and claimed subject matter is not so limited.

In operation, an image sensor (not shown in FIG. 3) may receive an image from second lens assembly 320 if the movable platform 310 is in a position that places second lens assembly 320 over the image sensor. On the other hand, the image sensor may receive an image from first lens assembly 330 if the movable platform 310 is in a position that places first lens assembly 330 over the image sensor. In this case, unselected lens assembly 320 may be placed in a position so as to occupy a space so that any light transmitted through unselected lens assembly 320 will not be received by the image sensor.

Movement of the movable platform 310 between a first and a second position may be induced, facilitated, or otherwise engendered by the actuator. For example, in one embodiment, a current pulse may be sent through coil 365 and may generate a magnetic field. The generated magnetic field may be such that coil 365 may encounter a repulsive force as to one or more of the magnets in the first and second magnet arrays 360 and 370. The generated magnetic field may also be such that coil 365 may encounter an attractive force as to one or more of the magnets in the first and second magnet arrays 360 and 370. For example, in one embodiment, a series of current pulses on coil 365 may engender motion of coil 365, and thus movable platform 310, along a first guide 322.

In one embodiment, a magnet, such as first magnet 361, may comprise a permanent magnet made from a material that is magnetized to create its own persistent magnetic field. Such a material may comprise, for example, a ferromagnetic material such as iron, nickel, cobalt, or some alloys of rare earth metals, just to name a few examples. A coil, such as coil 365, may comprise a wound coil, a printed coil, or an electroplated coil on a substrate, for example. A compact imaging module 300 may comprise a spring to provide a restoring force to a movable platform that supports two or more lens assemblies lens assembly. Of course, such details of a compact imaging module are merely examples, and claimed subject matter is not so limited.

In a first embodiment and as explained above, both first and second magnet arrays may individually comprise magnets that are arranged so that adjacent magnets have opposing magnetic poles. For example, if the north pole of magnet 361 is facing upward (e.g., toward coil 365), then the south pole of adjacent magnet 362 may be facing upward, and vice versa. Such an arrangement of lower and upper sets of magnets may interact with coil 365 so that coil 365 may move horizontally and/or vertically based, at least in part, on an amount of electric current supplied to coil 365, for example.

Coil 365 may be physically attached to upper portion 345a of a movable platform 310 that includes a first lens assembly 330 and a second lens assembly 320. First guide 322 may be used to guide the movable platform 310 along a horizontal direction and second guide 324 may be used to guide the movable platform 310 along a vertical direction. Of course, such details of compact imaging module 300 are merely examples, and claimed subject matter is not so limited.

In another embodiment, coil 365 may be configured to move only in a horizontal direction. In such a case, upper portion 345a of the movable platform 310 may include an inclined surface portion, for example, comprising a first side and a second side. This recessed region may receive a drive mechanism or slide. As described in U.S. patent application Ser. No. 13/802,472, the interaction of the slide with an inclined surface portion may transfer a mechanical force in a horizontal direction (imparted by coil 365, for example) to a mechanical force in a vertical direction. Such a force in a vertical direction may be used to change a distance between an image sensor and upper portion 345a that includes first and second lens assemblies 330 and 320, for example. Of course, such details of compact imaging module 300 are merely examples, and claimed subject matter is not so limited.

Figure 3B:
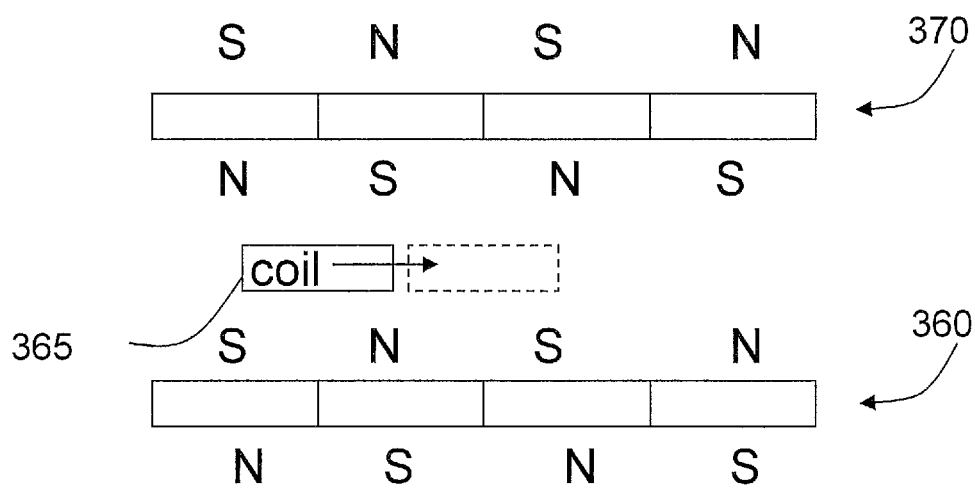

FIG. 3B shows a schematic diagram of an arrangement of a first magnet array 360, a second magnet array 370, and magnetic coil 365, according to an implementation. Magnetic poles of second magnet array 370 may be arranged alternately. Furthermore, magnetic poles of first magnet array 360 may be opposite that of corresponding second magnet array 370. If the direction of electrical current in coil 365 sequentially changes, the combination of magnetic fields of the first and second magnet arrays 360 and 370 and coil 365 may operate relative to coil 365 to generate horizontal motion thereof. Such motion of coil 365 may drive the upper portion 345a of a movable platform 310 to move horizontally. Vertical motion of a portion of movable platform 310 may be engendered in some embodiments.

Figure 3C:
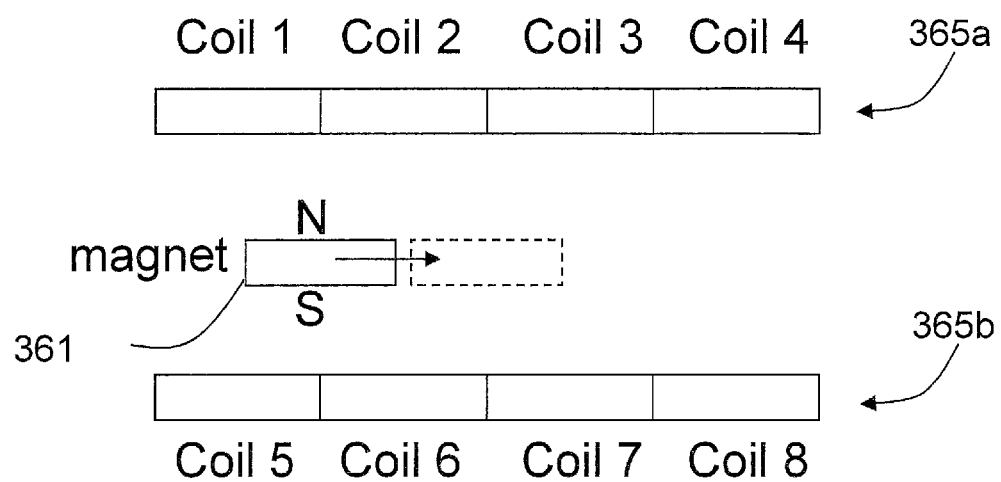

FIG. 3C shows a schematic diagram of an arrangement of a first coil set 365a, second coil set 365b, and a permanent magnet 361, according to an implementation. In one embodiment, the first coil set 365a may be configured such that coils 1-4 each comprise a current, and the electrical current polarity of each of coils 1-4 are opposite that of adjacent coils. Thus, in one case, if coil 1 comprises a current A, coil 2 may comprise a current −A; if coil 2 comprises a current −A, coil 3 may comprise a current A; and if coil 3 comprises a current A, coil 4 may comprise a current −A. Furthermore, the electrical current polarities of second coil set 365b may be opposite that of corresponding upper coils (e.g., coil 1 opposite of coil 5, coil 2 opposite of coil 6, coil 3 opposite of coil 7, and coil 4 opposite of coil 8). If the direction of electrical current in coils sequentially changes, the interaction of electromagnetic forces may induce movement of the magnet 361 in a horizontal direction.

For instance, in one non-limiting example, a magnet 361 may straddle coils 1 and 2 of a first coil set 365a, and coils 5 and 6 of a second coil set 365b. A current A may be pulsed through coils 1 and 6, and a current −A may be pulsed through coils 2 and 5. The current pulses of A and −A may induce the formation of an electromagnetic field around coils 1, 2, 5 and 6, respectively. The electromagnetic field formed surrounding coil 1 may induce a repulsive force as to the north pole of magnet 361, and the electromagnetic field formed surrounding coil 2 may induce an attractive force as to the north pole of magnet 361. Likewise, the electromagnetic field formed surrounding coil 5 may induce a repulsive force as to the south pole of magnet 361, and the electromagnetic field formed surrounding coil 6 may induce an attractive force as to the south pole of magnet 361, for example. In this case, the aggregate of attractive and repulsive forces acting on magnet 361 may induce motion of magnet 361 in a first direction, as indicated by the arrow and broken-lined rectangle in FIG. 3C such that after moving in the first direction, magnet 361 is arranged so as to straddle coils 2, 3, 6, and 7. Once in this position, a plurality of current pulses may be pulsed to coils 2, 3, 6, and 7 so as to induce further repulsive and attractive forces, and therefore, further motion of magnet 361 in the first direction. Such motion of magnet 361 relative to first and second coil sets 365a and 365b may propel a movable platform 310 to move horizontally. Vertical motion of a portion of movable platform 310 may be engendered in some embodiments as well. One of ordinary skill in the art would readily understand the value of configuring a device to induce motion by way of coils and magnets, and the preceding example is provided to illustrate several overarching principles of operation, and is thus not intended to be understood in a restrictive sense.

Figure 4A:
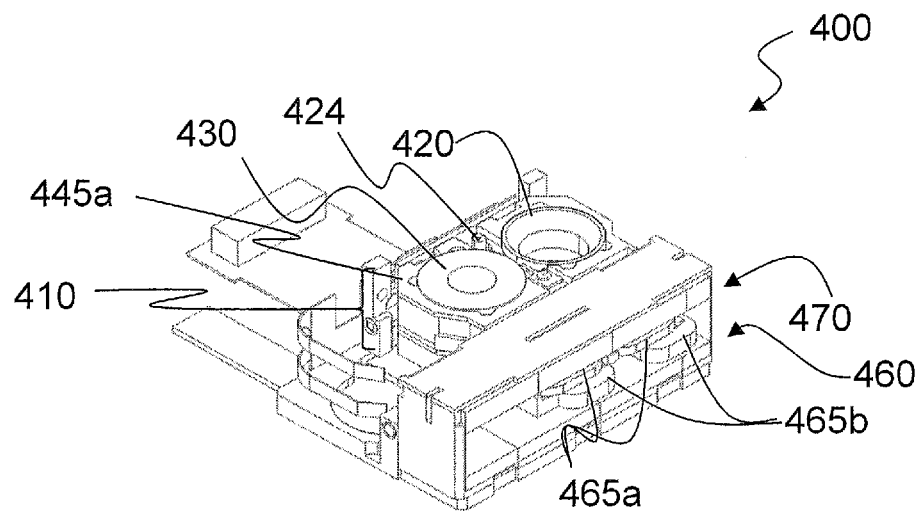
FIGS. 4A-4C illustrate perspective views of a compact imaging module, according to an embodiment.

FIG. 4A is a profile view of one embodiment of a compact imaging module 400. Compact imaging module 400 may comprise a movable platform 410 comprising a first and second lens assembly 430 and 420, which may be fixably connected to an upper portion 445a of movable platform 410. Movable platform 410 may be connected to one or more coils, such as a first coil set 465a and a second coil set 465b. First and second coil sets 465a and 465b may be alternatively referred to as AF coils and swapping coils, respectively. Second coil set 465b may be arranged in proximity to a first magnet array 460. First coil set 465a may be arranged in proximity to a second magnet array 470. As used herein, a coil and a magnet may be considered in proximity to each other while they are sufficiently close such that the coil is arranged in an electromagnetic field of the magnet, and/or the magnet is in an electromagnetic field formed around the coil while current is pulsed through the coil. First and second coil sets 465a and 465b may comprise one or more coils of a variety of types and architectures as described above.

In one embodiment, movable platform 410 may be slidably attached to a second guide 424 such that, for instance, upper portion 445a and first and second lens assemblies 430 and 420 may move in a direction parallel with an axis of second guide 424. For instance, upper portion 445a and first and second lens assemblies 430 and 420 may be configured to move vertically. In one embodiment, the vertical movement of first and second lens assemblies 430 and 420 may alter a focal ratio and/or change the focus of light entering a lens assembly and impacting upon an image sensor.

In operation a compact imaging module 400 may be used in order to manipulate and/or otherwise control light being received at an image sensor. For instance, it may be desirable to use one of a plurality of lenses. By way of example, a compact imaging module 400 may comprise a first lens assembly 430 having a first set of image characteristics (e.g., zoom, aspect ratio, among other things) and a second lens assembly 420 having a second set of image characteristics. In this example, it may be determined that the first lens assembly 430 is the assembly through which light should pass towards an image sensor. If the first lens assembly 430 is not already in position over the image sensor, a current may be pulsed through second coil set 465b. The current pulse through second coil set 465b may induce an electromagnetic field to be formed surrounding second coil set 465b. Related to the electromagnetic field, an attractive force may form between one or more magnets within first magnet array 460, and a repulsive force may form between one or more magnets within first magnet array 460. The attractive and/or repulsive forces may work in concert to induce or impel movement of second coil set 465a in a first direction, for example. In one example, it may be useful to provide one or more current pulses of differing magnitudes and/or polarity. In one embodiment, a first current pulse may have a first current magnitude and a first current polarity, and a second current pulse may have a second current magnitude and a second current polarity. In at least one case, the first and second current polarities may be opposite.

Once one or more current pulses have moved first lens assembly 430 into the desired position, it may be useful to adjust, among other things, the focal length or ratio between first lens assembly 430 and the image sensor (see, e.g., 208 in FIG. 2). For example, there may be a desire to focus light entering first lens assembly 430 onto the image sensor, among other things. In one implementation, this may be accomplished by moving the first lens assembly 430 in a second direction. In order to engender motion of first lens assembly 430, a current may be pulsed on a first coil set 465a. As described above, the pulsed current may induce an electromagnetic field to form around first coil set 465a. The formation of an electromagnetic field may lead to the formation of attractive and/or repulsive forces between first coil set 465a and second magnet array 470. In one embodiment, a different current may be pulsed on one coil of first coil set 465a as compared to a second coil of first coil set 465a. For example, in one implementation, first coil set 465a may comprise two coils, and a first current pulse may be applied the first coil and a second current pulse may be applied to the second coil. The first and second current pulses may be selected to form electromagnetic fields complementary with the one or more magnet in second magnet array 470. Thus, in one example, the electromagnetic force formed between each coil of first coil set 465a and the corresponding magnet of second magnet array 470 may be such to induce movement of first coil set 465a and upper portion 445a in a second, or vertical, direction. For instance, in one example, an attractive force may be formed that propels first coil set 465a, upper portion 445a, and first and second lens assemblies 430 and 420 to move in a second, or vertical direction, so as to increase a distance between first and second lens assemblies 420 and 430 and the image sensor. In another example, a repulsive force may be formed that propels first coil set 465a, upper portion 445a, and first and second lens assemblies 430 and 420 to move in the second, or vertical, direction so as to decrease a distance between first and second lens assemblies 420 and 430 and the image sensor. Of course, the foregoing description of horizontal and vertical movement is provided to illustrate general principles of operation and are not intended to be interpreted restrictively. Indeed, a variety of additional devices, structures, architectures, and methods are contemplated by the present disclosure and as would be understood by one of ordinary skill in the art.

Figure 4B:
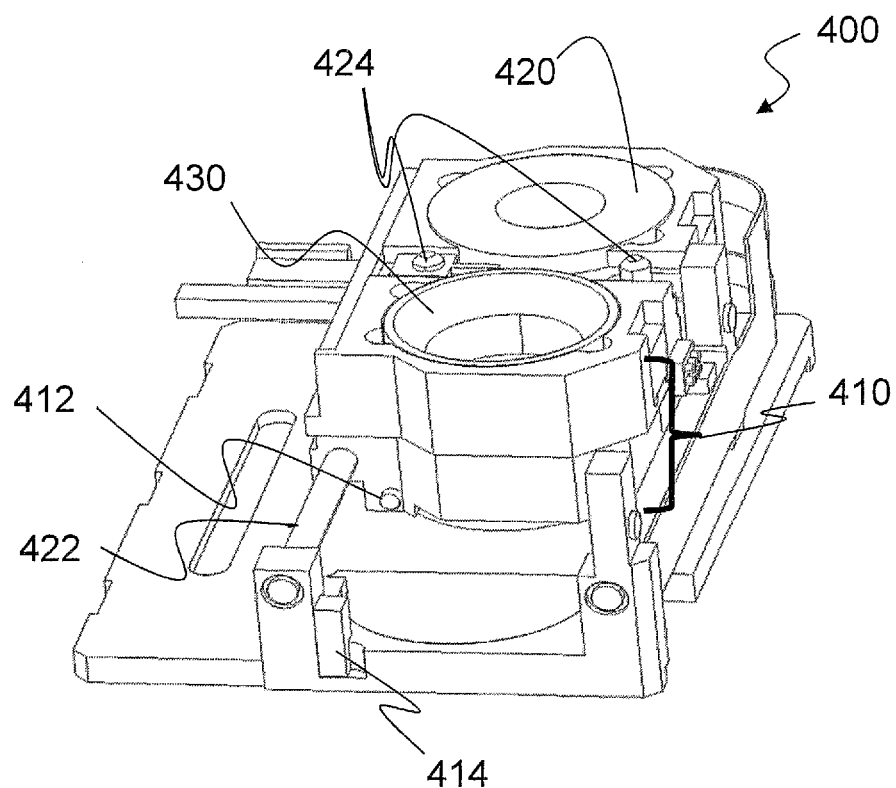
Figure 4C:
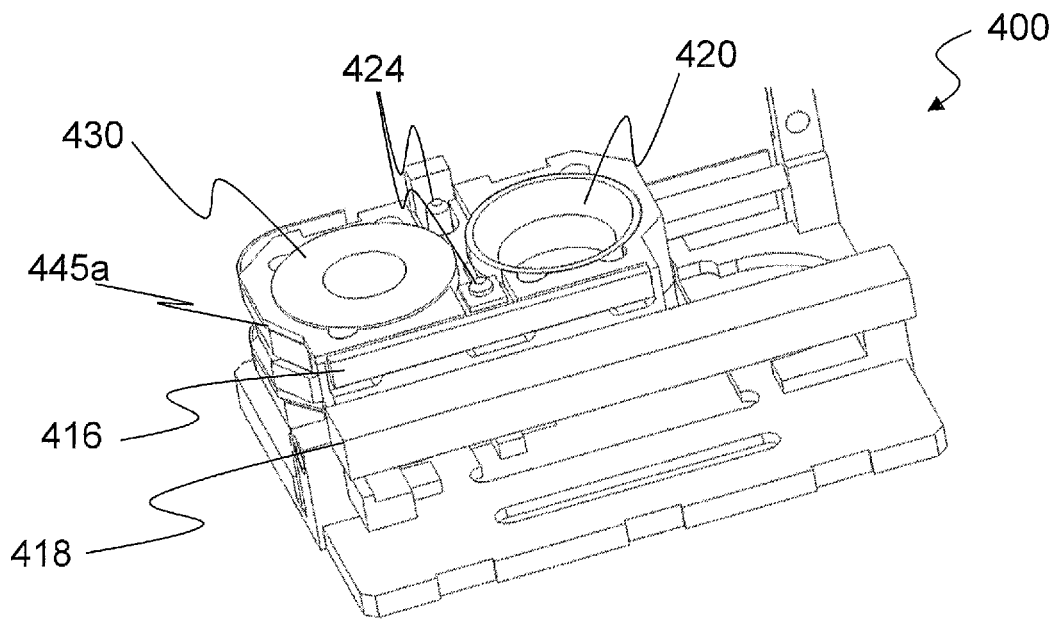

FIGS. 4B and 4C show additional detail of compact imaging module 400 according to one embodiment. FIG. 4B illustrates a pair of second guides 424 and a pair of first guides 422 upon which movable platform 410 may move in a first and/or a second direction, such as horizontally and vertically, among other things. Compact imaging module 400 also includes a first restraint mechanism 412 and a second restraint mechanism 414. First restraint mechanism 412 may comprise any suitable mechanism configured to restraint movement of movable platform 410, for instance a magnet or a metal stud, among other things. Similarly, second restraint mechanism 414 may comprise a material and or mechanism configured to work in concert with first restraint mechanism 412 to restrain movement of movable platform 410. In one example, first restraint mechanism 412 may comprise a metal stud and second restraint mechanism 414 may comprise a magnet. In this example, first and second restraint mechanisms 412 and 414 may be configured such that an attractive force may maintain first and second restraint mechanisms 412 and 414 in contact, and thereby constrain movement of movable platform 410. In another embodiment, compact imaging module 400 may comprise restraint mechanisms at both ends of first guides 422 such that movable platform 410 may remain secured, and movement thereof restrained, even while no current is being fed through any of first or second coil sets 460 and 470. Thus, the desired lens assembly (e.g., 420 or 430) may remain over, or in proximity to, image sensor unless a force is applied sufficient to overcome the force of the relevant restraint mechanism (e.g., 412 and 414).

FIG. 4C illustrates a compact imaging module 400 comprising a first and second lens assembly 430 and 420, a pair of second guides 424, and a third restraint mechanism 416 and a fourth restraint mechanism 418. Consistent with the foregoing, third and fourth restraint mechanisms 416 and 418 may comprise any suitable form of physical restraint including, but not limited to, electromagnetic restraints. For instance, in one embodiment, third restraint mechanism 416 may comprise a thin metal strip and fourth restraint mechanism 418 may comprise a magnet, and may be configured such that while an upper portion 445a is in an elevated position, an attractive force between third and fourth restraint mechanisms 416 and 418 may act to constrain motion of upper portion 445a. In another embodiment, third and fourth restraint mechanism 416 and 418 may be configured to constrain motion in a different direction.

In one exemplary embodiment, third restraint mechanism 416 may comprise a metal strip may be arranged in proximity to an electromagnetic element, such as one of the magnets in second magnet array 370 or fourth restraint mechanism 418. An attractive or repulsive force may exist between third restraint mechanism 416 and the relevant electromagnetic element. In one implementation, the existing force may lead to a frictional force between movable guide 410 and first guide 422 or second guide 424, among other things. The resultant frictional force may be sufficient to constrain motion of movable platform 410.

Figure 5:
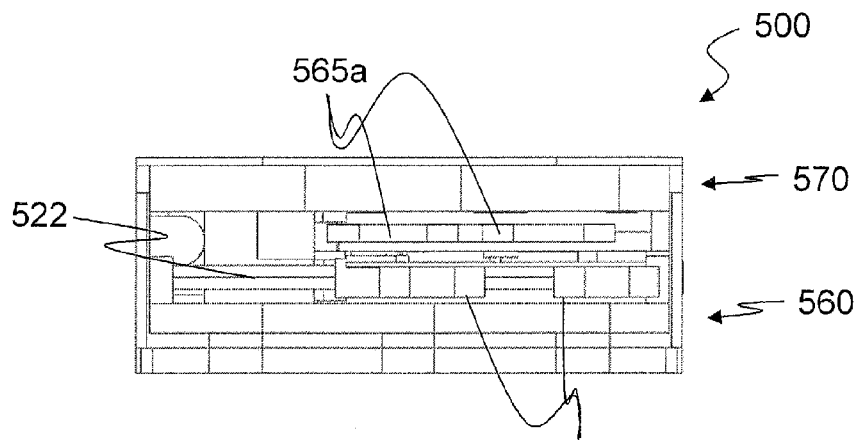
FIGS. 5 and 6A-6B illustrate schematic cross section views of a compact imaging module, according to an embodiment.

FIG. 5 is a cross-section of a compact imaging module 500. In one embodiment, compact imaging module 500 may comprise a plurality of lens assemblies in a movable platform (not shown) configured to move in one direction along a first guide 522, and in a second direction along a second guide (not shown). A combination of coils and magnets may be used in order to facilitate or otherwise engender motion of the movable platform. For instance, in one embodiment, compact imaging module 500 may comprise a first and second magnet array 560 and 570, and a first and second coil set 565*a* and 565*b*, among other things. In one implementation, a first coil set 565*a* may be arranged in proximity to the second magnet array 570, and a second coil set 565*b* may be arranged in proximity to a first magnet array 560. By way of example, the individual magnets making up the first and second magnet arrays 560 and 570 may be arranged such that each adjacent magnet has a different polarity. Furthermore, corresponding magnets in the first and second magnet arrays 560 and 570 may be completely aligned or offset. For instance, in one implementation the magnets of the first and second magnet arrays 560 and 570 may be arranged such that an imaginary vertical plane extending from each magnet of the second magnet array 570 will intersect at least two magnets of the first magnet array 560, as illustrated in FIG. 5. Of course, any number of alignments of magnets of first and second magnet arrays 560 and 570, be they offset or otherwise, are contemplated by the present disclosure.

Figure 6A:
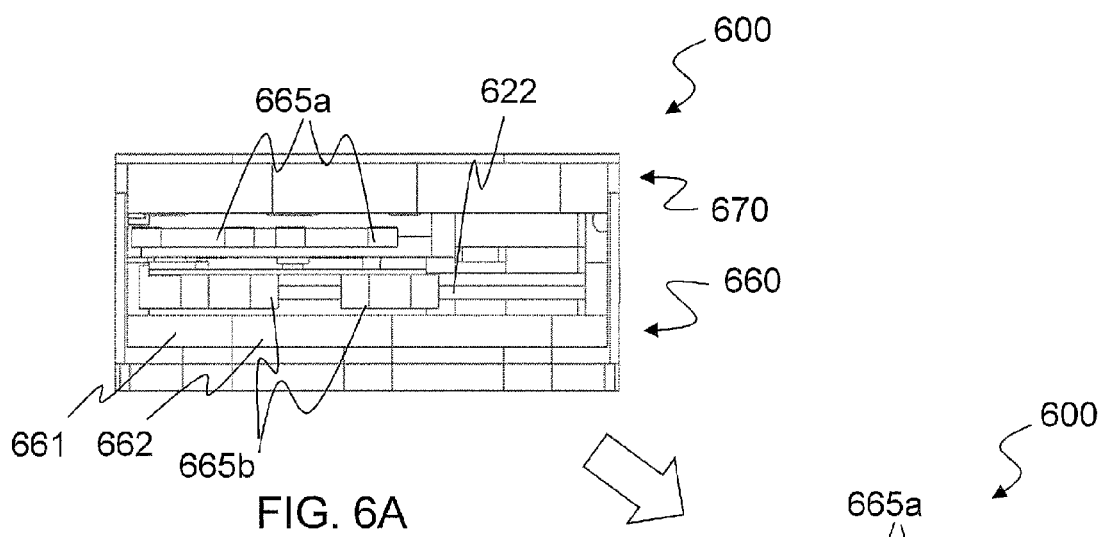
Figure 6B:
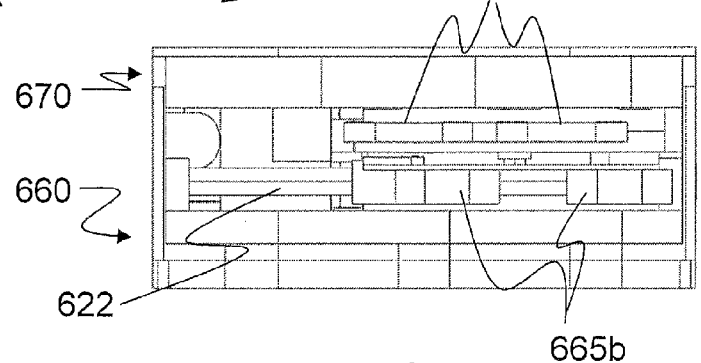

Operation of a compact imaging module 600, as seen from a cross-section thereof, is illustrated in FIGS. 6A and 6B. For instance, in one embodiment, a movable platform may have at least a first and a second position, illustrated by FIG. 6A and FIG. 6B, respectively. In this embodiment, current may be pulsed to second coil set 665*b*, which may in turn generate an electromagnetic field that may interact with first magnet array 660 so as to engender or otherwise facilitate movement of the movable platform in a first direction along a first guide 622.

For instance, a movable platform comprising a first and second lens assembly (not shown) may be in a first position as shown in FIG. 6A. While in the first position, either the first or second lens assembly may be positioned over an image sensor. Further, while in the first position, the second coil set 665 may be arranged over magnets of the first magnet array 660 such that each coil of the second coil set 665 straddles two magnets, such as, for example, 661 and 662, of first magnet array 660, as shown in FIG. 6A. If no current flows through second coil set 665, the movable platform may remain stationary. In one embodiment, a set of one or more restraint mechanisms may be used to constrain movement, as discussed above in relation to FIGS. 4B and 4C.

In one embodiment, it may be desired to move the movable platform 410 from the first position to a second position so as to place a different lens assembly in proximity to the image sensor. This movement may be induced by pulsing a current to second coil set 665*b*. As one of ordinary skill in the art would understand, the appropriate current pulse may depend on, among other things, a particular arrangement and type of coils in second coil set 665 and a particular arrangement and type of magnets in first magnet array 660. Additionally, a determination of the appropriate current pulse may also be related to a force to overcome a particular restraint mechanism being employed in a particular embodiment. For instance, in one implementation a magnet and metal stud may be used as first and second restraint mechanisms (see 412 and 414 of FIG. 4B) and may exert a force of X on the movable platform in order to constrain movement thereof. In this example, the particular current pulse selected to propel movement of the movable platform may result in a force sufficient to overcome X. While a current is pulsed to second coil set 665*b*, an electromagnetic field may be formed around the coils of second coil set 665*b*. This electromagnetic field may lead to the formation of an attractive force and/or a repulsive force. For instance, in one embodiment, a repulsive force may form between one or more magnets of first magnet array 660 (e.g., magnet 661) and one or more coils of second coil set 665*b*, and the repulsive force may at least partially induce movement of second coil set 665*b* in a first direction. Additionally, an attractive force may form between one or more magnets of first magnet array 660 (e.g., magnet 662) and one or more coils of second coil set 665*b*, and the attractive force may also at least partially induce movement of second coil set 665*b* in the first direction. In this implementation, the combined repulsive and attractive forces may be sufficient to overcome the restraining force and move second coil set 665*b* in a first direction. The electromagnet actuator may therefore be configured to move the movable platform 410 from the first position to the second position.

As illustrated in FIG. 6B, once the movable platform is in a second position in one embodiment, each coil of the second coil set 665*b* may once again be straddling two magnets of first magnet array 660. Such an arrangement may be advantageous to facilitate further movement of second coil set 665*b*, among other things. Indeed, in one embodiment, second coil set 665*b* may be pulsed with a current pulse, which may lead to the formation of attractive and repulsive forces sufficient to induce movement of the movable platform in the first direction. For instance, movable platform may return to the first position in one example by pulsing a current to second coil set 665*b*. The foregoing description of movement of a movable platform and a second coil set 665*b* is provided to illustrate a general principle of movement that may be achieved with an actuator comprising electromagnetic elements. As one of ordinary skill in the art would understand, any number of further implementations, devices, and methods are contemplated by the present disclosure.

FIGS. 7A and 7B are top-down views of a compact imaging module 700 according to one embodiment. In this illustrative example, FIG. 7A illustrates a first position where a second lens assembly 720 is positioned over an image sensor (not shown), and FIG. 7B illustrates a second position where first lens assembly 730 is positioned over the image sensor. First and second lens assemblies 730 and 720 may be arranged or connected to a movable platform 710, which may move in a first direction along a pair of first guides 722, and which may further move in a second direction along a pair of second guides 724.

In operation, and as discussed above, an electromagnetic actuator may be propel movement of movable platform 710 along the pair of first guides 722. In one example, an attractive and/or repulsive force between coils and magnets may propel movement in a first direction, such that movable platform 710 moves from a first position to a second position, and vice versa.

Returning to FIGS. 6A and 6B, first coil set 665a may be used to facilitate or otherwise propel movement of a movable platform in a second direction. In one embodiment, each coil of first coil set 665a is aligned with a magnet of second magnet array 670 in both the first and second positions. A current may be pulsed to first coil set 665a, which may lead to the creation of an attractive or repulsive force between first coil set 665a and second magnet array 670. In this example, if an attractive force is created, first coil set 665a may move in a second direction, for instance, towards second magnet array 670, among other things. If a repulsive force is created, first coil set 665a may move in a second direction, for instance, away from second magnet array 670, among other things. The operation of movement in the second direction is illustrated further in FIGS. 8A and 8B.

FIGS. 8A and 8B are a side-view of a movable platform 810 comprising an upper portion 845a and a lower portion 845b. In one embodiment, first and second lens assemblies 730 and 720 may be fixably connected to upper portion 845a of movable platform 810. According to yet another embodiment, first coil set 865a may be connected to upper portion 845a of movable platform 810, and second coil set 865b may be connected to lower portion 845b of movable platform 810. In this example, a pair of first guides 822 may be slidably connected to lower portion 845b, and a pair of second guides 824 may be slidably connected to upper portion 845a. As was discussed above, first coil set 865a may be arranged in proximity to a second magnet array, of which magnet 861 may be a component, and second coil set 865b may be arranged in proximity to a first magnet array, of which magnet 862 may be a component.

In operation a current pulse may be applied to first coil set 865a. The applied current may induce or otherwise facilitate an attractive or repulsive force between first coil set 865a and magnet 861 of the second magnet array. FIG. 8A shows upper portion 845a in a first position having a separation between first coil set 865a and magnet 861 of the second magnet array. From this first position, a pulsed current may cause the formation of an attractive force between first coil set 865a and the second magnet array, thus inducing movement of the first coil set 865a and upper portion 845a in a second direction, or vertically upwards, as shown in FIG. 8B. As discussed previously, one or more restraint mechanisms may be used in order to constrain movement of the upper portion 845a once in the desired position.

From the second position, illustrated in FIG. 8B, a current may be applied to first coil set 865a in order to induce a repulsive force between first coil set 865a and magnet 861. The repulsive force may overcome the relevant restraint mechanisms, and cause first coil set 865a and upper portion 845a to return to the first position illustrated in FIG. 8A. Once again, upper portion 845a and first coil set 865a may be constrained to the first position by one or more restraint mechanisms. In one embodiment, movement of movable platform 810 in a second direction may be configured to provide auto focus functionality to compact imaging module 800, among other things. While the foregoing description of movement has been in a binary or two-position embodiment, as one of ordinary skill in the art would readily understand, the current disclosure also contemplates continuous and analog implementations thereof as well.

Figure 9A:
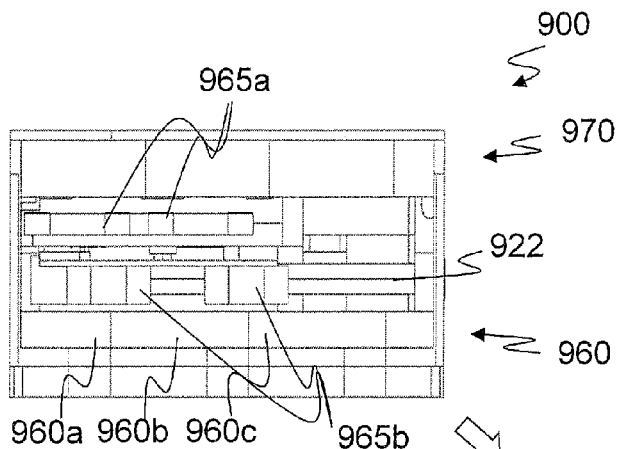
FIGS. 9A-9C illustrate a side view of a compact imaging module, according to an embodiment.
Figure 9B:
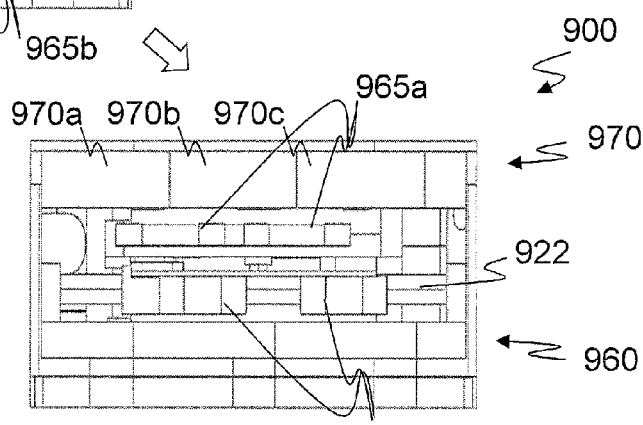
Figure 9C:
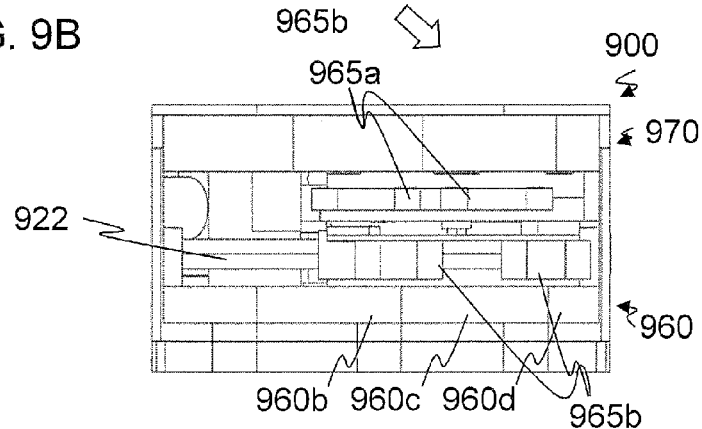

FIGS. 9A-9C are cross-section views of a compact imaging module 900 illustrating an embodiment thereof wherein both first and second coil sets 965a and 965b may be used in concert to induce or otherwise facilitate movement of a movable platform in a first direction. FIG. 9A illustrates one embodiment of compact imaging module 900 similar to those discussed above. In one embodiment, compact imaging module 900 comprises a first and second magnet array 960 and 970 and a first and second coil set 965a and 965b, which may be connected to a movable platform (not shown). The movable platform may move in a first direction and may be placed at a plurality positions along first guide 922. For instance, in one embodiment, FIG. 9A represents a first position of movable platform, FIG. 9B represents a second position of movable platform, and FIG. 9C represents a third position of movable platform. One of ordinary skill in the art will note that at each of the first, second, and third positions of movable platform, a different combination of either first and second coil sets 965a and 965b straddle multiple magnets of either first and second magnet arrays 960 and 970. For example, in a first position, the coils of second coil set 965b may be arranged so as to straddle magnets 960a, 960b, and 960c of first magnet array 960. In a second position, coils of first coil set 965a may straddle magnets 970a, 970b, and 970c of second magnet array 970. And in a third position, coils of second coil set 965b straddle magnets 960b, 960c, and 960d of first magnet array 960.

While this embodiment of compact imaging module 900 is in operation, in a first position, a current may be applied to second coil set 965b. In this particular embodiment, the current pulse to the leftmost coil of the second coil set 965b may induce a repulsive force as between the leftmost coil and magnet 960a and an attractive force between the leftmost coil and magnet 960b. Concurrently, a current pulse applied to the rightmost coil of second coil set 965b may induce a repulsive force between the rightmost coil and magnet 960b and an attractive force between the rightmost coil and magnet 960c. The combination of attractive and repulsive forces may be sufficient to induce or otherwise facilitate movement of the movable platform from the first position shown in FIG. 9A to the second position shown in FIG. 9B. Rather than pulsing current to the individual coils of second coil set 965b concurrently, in another embodiment, current may be pulsed to one coil of second coil set 965b at a time. Of course, other arrangements and processes are also contemplated by the current disclosure.

In some embodiments, first coil set 965a may contribute to induce or otherwise facilitate motion of movable platform from the second position shown in FIG. 9B to either the first or the third positions, shown in FIGS. 9A and 9C, respectively. As discussed above, while the movable platform and the first coil set 965a are in a second position, the coils of first coil set 965a may straddle magnets 970a, 970b, and 970c of second magnet array 970. As such, and similar to the foregoing discussion, a current may be pulsed to first coil set 965a in order to induce an attractive and/or repulsive force and thereby induce or otherwise facilitate movement of first coil set 965a and the movable platform from the second position illustrated in FIG. 9B to either the first position illustrated in FIG. 9A or the third position illustrated in FIG. 9C. In one embodiment, a first current may be pulsed to one coil of the first coil set 965a while a second current may be pulsed to the other coil of the first coil set 965a. In one example, one of the two current pulses may be a reverse current pulse.

In another embodiment, second coil set 965b may be arranged in a third position such that the coils of second coil set 965b straddle magnets 960b, 960c, and 960d of first magnet array 960 as illustrated in FIG. 9C. One or more current pulses may be applied to the coils of second coil set 965b and may induce an attractive and/or repulsive force between the coils of second coil set 965b and first magnet array 960, which may induce or otherwise facilitate movement of second coil set 965b and the movable platform from the third position illustrated in FIG. 9C to the second position illustrated in FIG. 9B. The foregoing description of movement between first, second, and third positions of the movable platform is provided and intended to illustrate general principles of operation and is not to be taken in a restrictive sense. Indeed, as would be readily understood by one of ordinary skill in the art, any number of additional embodiments of apparatuses and/or methods are contemplated by the present disclosure.

Figure 10:
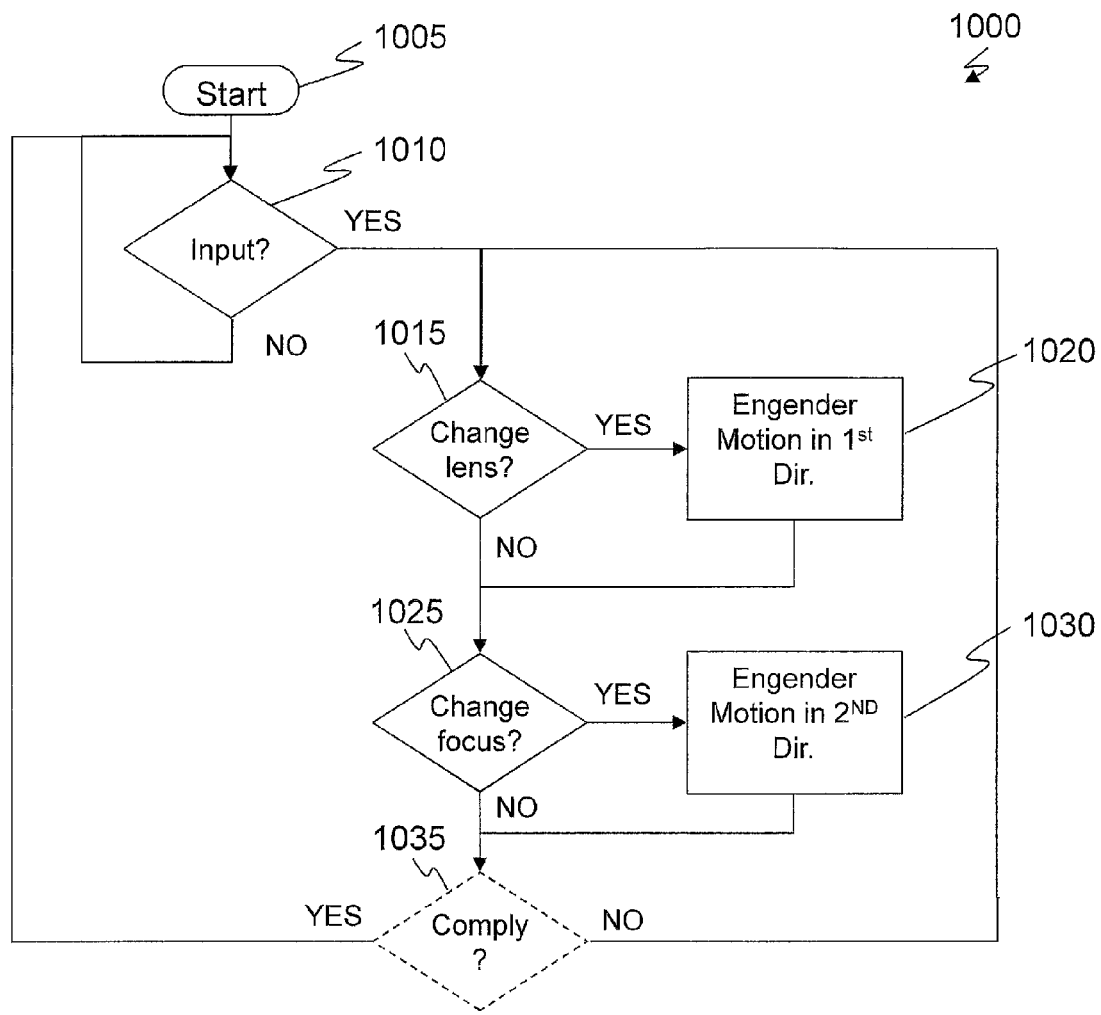
FIG. 10-12 are flowcharts illustrating different methods of using a compact imaging module according to one embodiment.

FIG. 10 is a flow diagram illustrating a method 1000 of operating one embodiment of a compact imaging module. Method step 1005 represents an initial starting phase of method 1000. In one embodiment, step 1005 may represent an initialization of an electronic device and/or compact imaging module. Alternatively, step 1005 may represent the initialization of a piece of software, such as a driver or other software that might comprise an intermediary between a user and the compact imaging module.

In a next method step 1010, a routine is run to detect input from a device or user. For instance, in one embodiment compact imaging module may have a detection means, comprising hardware, software, or a combination thereof, configured to detect input from a user or a device. In another embodiment, a compact imaging module may comprise a part of a larger device, such as a telephone or tablet, and a piece of software and/or hardware of the larger device may run a routine to monitor the compact imaging module and/or detect signals being sent thereto.

In method step 1010, if an input is detected, the routine may next determine whether there is a need to change the lens assembly of the compact imaging module in step 1015. Step 1015 may comprise determining which lens assembly to use based on settings of the compact imaging module and/or the relevant device, and then a determination as to whether the desired lens assembly is positioned over the image sensor. Thus, in one embodiment a determination of whether or not to change the lens assembly will be based on the desired lens and whether the desired lens is in place.

If it is determined that the correct lens assembly is not in place, then method step 1020 comprises engendering or inducing motion of a desired lens in order to arrange it in proximity with the image sensor. As described above, this may be performed by an electromagnetic actuator comprising coils and magnets, among other things. In one embodiment, current may be pulsed to one or more coils, inducing an attractive and/or repulsive force sufficient to engender, induce, or otherwise facilitate motion of the desired lens assembly.

Once the desired lens assembly is in place, at method step 1025 it is determined whether there is a need to adjust or change the focus of the desired lens assembly. If it is determined that there is a need to change a focal length between the desired lens assembly and the image sensor, then the routine may continue to method step 1030. In one embodiment, in order to engender or induce motion of the desired lens assembly in a second direction, a current pulse may be applied to one or more coils and the current pulse may induce an attractive and/or repulsive force sufficient to engender or induce motion of the desired lens assembly relative to the image sensor. For example, the desired lens assembly may move in a direction so as to increase a focal length between the desired lens assembly and the image sensor. Or, in another example, the desired lens assembly may move in a direction so as to decrease a focal length between the desired lens assembly and the image sensor.

In an optional method step 1035, a determination may be made as to whether the selected lens and focal length is within an acceptable range of compliance. According to this step, if it is determined that there is not sufficient compliance, then the routine may return to method step 1015. Otherwise, the routine may return to method step 1010. The foregoing discussion is intended to be illustrative of general concepts and principles and is not intended to be taken in a restrictive sense. Indeed, as would be readily apparent to one of ordinary skill in the art, any number of possible method and apparatus embodiments are contemplated by the present disclosure.

Figures 11, 12:
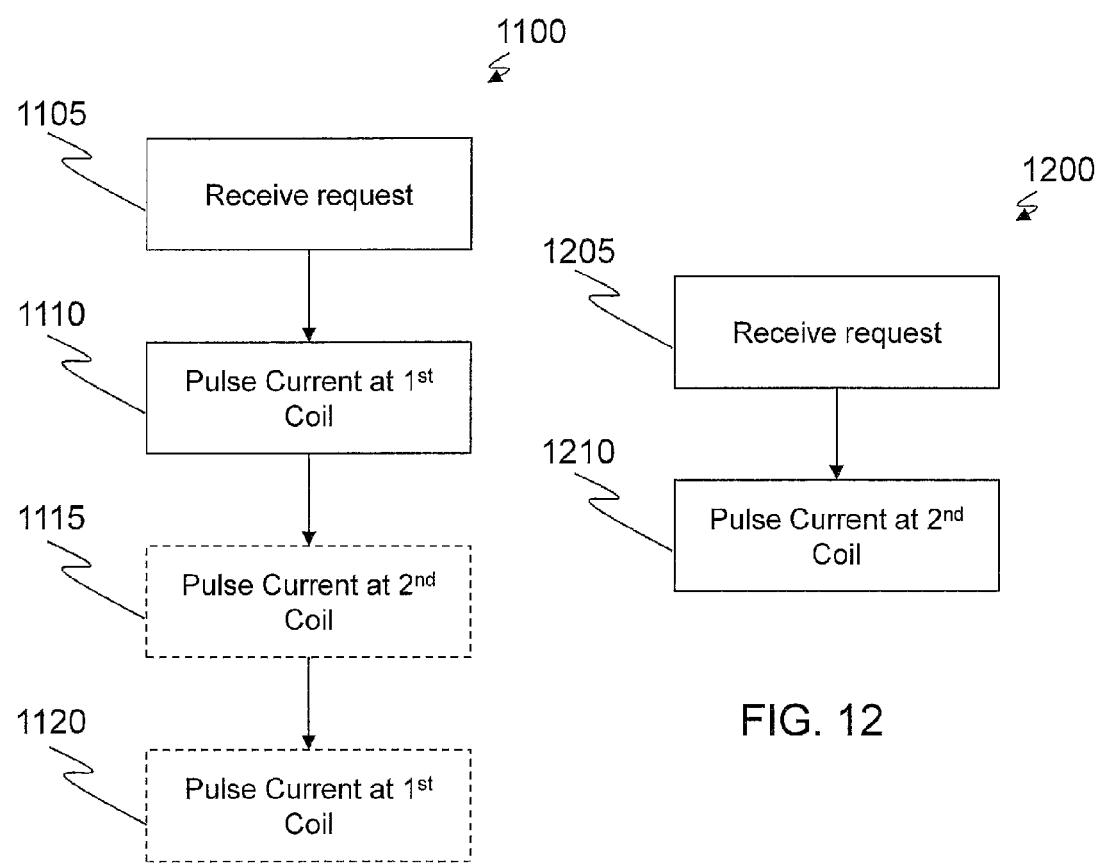

FIG. 11 illustrates a method 1100 of inducing or otherwise facilitating motion of a movable platform and/or lens assembly according to one embodiment. In a first method step 1105, a compact imaging module receives a request related to the movement of a movable platform and/or lens assembly. In one embodiment, the request may be related to moving the movable platform and/or lens assembly in a first direction, such as, for example, a horizontal direction.

According to one embodiment, movement of the movable platform and/or lens assembly may be accomplished by pulsing a current at a first coil of the movable platform and/or connected to the lens assembly, as illustrated by step 1110. For example, the pulsed current may induce the formation of an attractive and/or repulsive electromagnetic force sufficient to engender motion of the movable assembly.

In an optional method step 1115, a current pulse may be applied to a second coil. In some embodiments, it may be advantageous to pulse a plurality of coils at different times in order to induce motion of the movable platform and/or lens assembly from a first position to a second position, as described above in relation to FIGS. 9A-9C.

In an optional method step 1120, a current pulse may be again applied to the first coil in order to further induce motion of the movable platform towards a desired position. As described above, in one example, the foregoing current pulses may be sufficient to move a lens assembly from a first position to a second position, so as to place the lens assembly in a desired position relative to an image sensor.

In one embodiment, once the lens assembly is in a desired position, a focal length between the lens assembly and the image sensor may be adjusted as illustrated in FIG. 12.

FIG. 12 illustrates a method 1200 comprising a method step 1205 comprising receiving a request. For example, a compact imaging module may receive a request related to the focus of a lens assembly. For instance, it may be useful to adjust a focal length between a given lens assembly and an image sensor in order to achieve an optimal image, among other things. Thus, upon reception of a request to adjust the focal length, a current may be pulsed onto a coil in order to propel movement of the lens assembly and achieve a desired focus. Of course, as one of ordinary skill in the art would appreciate, in some implementations, a plurality of current pulses may enable achieving a desired focus. However, the foregoing description of operation of the compact imaging module is provided for illustrative purposes and is not intended to be understood in a restrictive sense.

Figure 13:
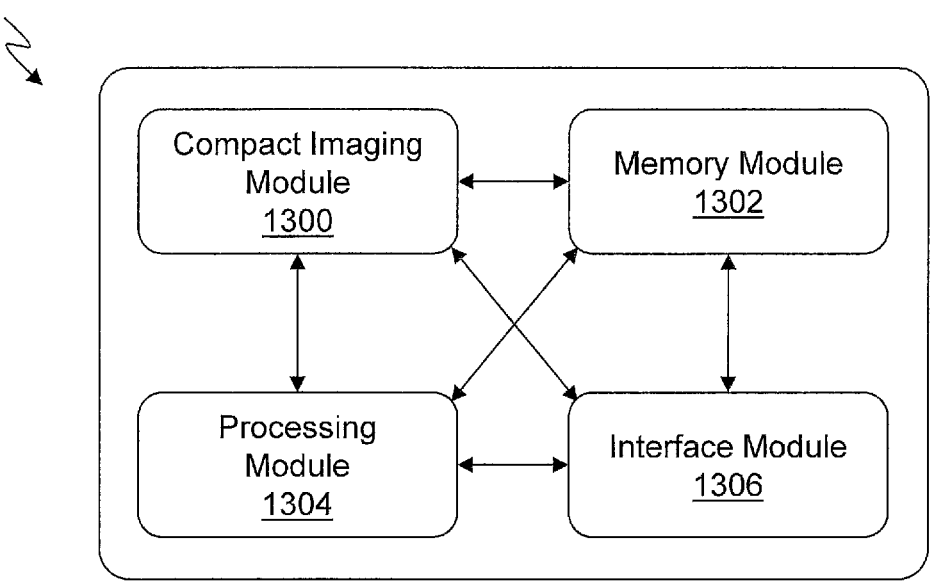
FIG. 13 is a block diagram illustrating an exemplary device configured to use a compact imaging module according to one embodiment.

FIG. 13 is a block diagram illustrating a plurality of modules that may be used in conjunction with a compact imaging module 1300 according to one embodiment. Indeed, a device 1301 comprising compact imaging module 1300 may also include a memory module 1302, an interface module 1306, and a processing module 1304, among other things. In some cases the compact imaging module 1300, the memory module 1302, the processing module 1304, and the interface module 1306 may all be communicatively connected in order to allow the transmission and reception of electrical signals therebetween. Device 1301 and its modules and parts may comprise any form and combination of hardware and software to implement instructions stored upon a non-transitory computer readable medium. For instance, in one implementation, device 1301 may be a wireless device such as a telephone, a computing device such as a computer or tablet, a wearable device such as glasses, or any other device configured to capture an image.

Compact imaging module 1300 may comprise any combination of hardware and software, as discussed at length above, in order to manipulate a plurality of lenses capture images, among other things. As discussed above, compact imaging module may comprise an image sensor, a plurality of lenses, and an electromagnetic actuator comprising a plurality of coils and a plurality of magnet arrays, among other things.

Memory module 1302 may comprise any module, in hardware, software, or a combination thereof, configured to store values and/or signals. In one embodiment, memory module 1302 comprises a non-transitory computer readable medium configured to store a plurality of values and/or signals. Memory module 1302 may store the plurality of values and/or signals in electric, magnetic, and/or resistive forms, among other things. In one embodiment, memory module 1302 may comprise information to facilitate the operation of compact imaging module 1300, such as a device driver, among other things. Memory module 1302 may also comprise an operating system operated by device 1301.

Interface module 1306 refers general to a plurality of possible functionality. For instance, interface module 1306 may facilitate communication of device 1301 with a variety of other devices, such as, for example, via a wireless communication module. Interface module 1306 may also facilitate wired communication with device 1301 and its subparts. Additionally, interface module 1306 may also act as an intermediary between a user and device 1301, such as, for example, receiving input from users and transmitting signals to peripheral devices and/or modules, among other things.

Processing module 1304 may comprise a special purpose processing unit configured to implement programming stored in memory module 1302 and otherwise coordinate the functioning of interface module 1306 and compact imaging module 1300, among other things.

In operation, input from a user may be received at interface module 1306. The input may be transmitted to the processing module 1304 for processing. In one embodiment, processing module 1304 may determine that the user wishes to take a picture or capture an image or combination of images. Processing module 1304 may send a request to memory module 1302 to call up the instructions to capture an image or combination of images. Processing module 1304 may determine that it is necessary to change a lens assembly of compact imaging module 1300, and so an appropriate request may be sent to the compact imaging module 1300. In one embodiment, one or more current pulses may be sent to compact imaging module 1300 in order to induce movement of the lens assembly in a first direction so as to put the lens assembly in place relative to the image sensor. Processing module 1304 may determine that there is a need to adjust a focal length between the lens assembly and the image sensor and may therefore send a request to the compact imaging module 1300 to move the lens assembly accordingly. For instance, in one example, one or more current pulses may be transmitted in order to induce movement of the lens assembly in a second direction so as to place the lens assembly at the desired distance from the image sensor. In one implementation, processing module 1304 may also send a request to compact imaging module 1300 to capture an image or a plurality of images.

In one embodiment, the captured image(s) may be transmitted to memory module 1302 for storage, and processing module 1304 may process images. In one implementation, the captured image(s) may be transmitted via interface module 1306 to a display of device 1301. In another example, the captured image(s) may be transmitted via interface module 1306 to another device, such as a printer or a computer or server located on the Internet.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
   a plurality of lenses arranged in proximity to an image sensor;
   a first coil set arranged in proximity to a first magnet array; and
   a second coil set arranged in proximity to a second magnet array;
   wherein the plurality of lenses are configured to: (a) move in a first direction in response to a first force acting between the first coil set and the first magnet array and thereby change a zoom level of the apparatus, and (b) move in a second direction in response to a second force acting between the second coil set and the second magnet array and thereby change a focus of the apparatus, and wherein the first magnet array comprises a plurality of magnets arranged such that each magnet has a polarity different than each magnet adjacent thereto.

2. The apparatus of claim 1 further comprising a movable platform connected to the plurality of lenses and the first and second coil sets.

3. The apparatus of claim 2 wherein the movable platform comprises a first portion and a second portion and further wherein the first and second portions are configured to move in the first direction, and the first portion is configured to move in the second direction.

4. The apparatus of claim 1 further comprising:
one or more guides running parallel to the first direction; and
one or more guides running parallel to the second direction.

5. The apparatus of claim 1 wherein the first and second magnet arrays are offset.

6. The apparatus of claim 1 further comprising a restraint mechanism comprising:
a magnet and a metal stud capable of constraining movement of the plurality of lenses in the first direction; and
the restraint mechanism being capable of constraining movement of the plurality of lenses in the second direction via a frictional force.

7. The apparatus of claim 6 wherein at least one of the magnet or the metal stud are arranged in proximity to the first or second coil set.

8. The apparatus of claim 1 further comprising a position sensor capable of detecting a horizontal or a vertical position of the plurality of lenses with respect to a reference position.

9. The apparatus of claim 1 wherein the plurality of lenses are capable of moving in the first direction in response to the second force acting between the second coil set and the second magnet array.

10. A method comprising:
propelling motion of at least one of a plurality of lenses relative to an image sensor in a first direction to change a focus of said at least one of said plurality of lenses by applying a current pulse to a first coil proximate to a first magnet array comprising a plurality of magnets arranged such that each magnet has a polarity different than each magnet adjacent thereto; and
propelling motion of the at least one of the plurality of lenses relative to the image sensor in a second direction to change a zoom level by applying a current pulse to a second coil proximate to a second magnet array.

11. The method of claim 10 further comprising pulsing a current though the first coil, wherein the pulsed current induces a first attractive or repulsive force.

12. The method of claim 11 further comprising pulsing a current through the second coil, wherein the pulsed current induces a second attractive or repulsive force.

13. The method of claim 10 further comprising pulsing a current through the second coil, wherein the pulsed current induces an attractive or a repulsive force.

14. The method of claim 10 wherein the induced motion in the first direction is related to both an attractive and a repulsive force.

15. The method of claim 14 wherein the attractive force comprises a force between the first coil and a first magnet of the first magnet array, and the repulsive force comprises a force between the first coil and a second magnet of the first magnet array.

16. A device comprising:
an imaging module comprising:
a plurality of lenses arranged in proximity to an image sensor; and
an electromagnetic actuator configured to move the plurality of lenses in a first direction for adjusting a focus of the imaging module and a second direction perpendicular to the first direction for changing a zoom level of the imaging module;
the electromagnetic actuator comprising:
a first coil arranged in proximity to a first magnet array comprising a plurality of magnets arranged such that each magnet has a polarity different than each magnet adjacent thereto; and
a second coil arranged in proximity to a second magnet array.

17. The device of claim 16 wherein
the plurality of lenses are configured to: (a) move in a first direction in response to a first force acting between the first coil and the first magnet array, and (b) move in a second direction in response to a second force acting between the second coil and the second magnet array.

18. The device of claim 16 wherein the plurality of lenses are fixably connected to a first portion of a movable platform.

19. The device of claim 18 wherein the first portion is configured to move in both the first and second directions.

20. The device of claim 16 wherein the imaging module also comprises a restraint mechanism configured to constrain movement of the plurality of lenses.

21. The device of claim 16 wherein the imaging module is configured to perform autofocus functionality.

* * * * *

UNITED STATES PATENT AND TRADEMARK OFFICE
CERTIFICATE OF CORRECTION

| | | |
|---|---|---|
| PATENT NO. | : 8,792,782 B1 | |
| APPLICATION NO. | : 14/020551 | |
| DATED | : July 29, 2014 | |
| INVENTOR(S) | : Kwok Sing Cheng et al. | |

It is certified that error appears in the above-identified patent and that said Letters Patent is hereby corrected as shown below:

On the Title page of the "List of References cited" item (56), under Foreign Patent Document, the correct document number, "CN200920051121.3" should replace the "CN200920050021.3."

Signed and Sealed this
Ninth Day of December, 2014

Michelle K. Lee
*Deputy Director of the United States Patent and Trademark Office*